United States Patent
Chu

(12) United States Patent (10) Patent No.: US 6,213,429 B1
(45) Date of Patent: Apr. 10, 2001

(54) LIFE PRESERVER FOR AIRCRAFT

(76) Inventor: Hsin-Chuan Chu, P.O. Box 82-144, Taipei (TW)

( * ) Notice: Subject to any disclaimer, the term of this patent is extended or adjusted under 35 U.S.C. 154(b) by 0 days.

(21) Appl. No.: 09/431,960

(22) Filed: Nov. 1, 1999

(51) Int. Cl.[7] ................................................. B64D 25/02
(52) U.S. Cl. ...................... 244/140; 244/138 R; 441/87
(58) Field of Search ........................... 244/138 R, 141, 244/121, 140, 142; 52/2.23, 2.17; D29/100; 472/129; 441/66, 67, 87, 129, 130

(56) References Cited

U.S. PATENT DOCUMENTS

| | | | |
|---|---|---|---|
| 1,281,846 | * | 10/1918 | Salari ................................. 244/140 |
| 2,733,027 | * | 1/1956 | Gero ................................... 244/140 |
| 3,330,510 | * | 7/1967 | Johnson ........................... 244/138 R |
| 3,911,913 | * | 10/1975 | June ..................................... 441/87 |
| 4,739,953 | * | 4/1988 | Soffiantini ........................... 244/141 |
| 4,943,252 | * | 7/1990 | Manix .................................. 441/87 |

FOREIGN PATENT DOCUMENTS

| | | | |
|---|---|---|---|
| 680483 | * | 8/1939 | (DE) ............................... 244/138 R |
| 423783 | * | 4/1911 | (FR) ............................... 244/138 R |

\* cited by examiner

*Primary Examiner*—Galen L. Barefoot
(74) *Attorney, Agent, or Firm*—A & J

(57) ABSTRACT

A life preserver for aircraft includes a fire-protective, anti-knock, inflatable bag defining an inflatable chamber and a life chamber within the inflatable chamber and having an exit, a bumper frame structure supported inside the life chamber for protecting the user in the life chamber, a safety helmet with a mouthpiece connected to an oxygen cylinder mounted in the bumper frame structure for providing oxygen to the user, and a parachute carried on the inflatable bag on the outside and controlled by a rip cord suspended inside the life chamber.

1 Claim, 3 Drawing Sheets

LIFE PRESERVER FOR AIRCRAFT

BACKGROUND OF THE INVENTION

1. Field of the Invention

This invention relates to life preservers, and more specifically to a life preserver specifically designed for use in aircraft.

2. Description of the Prior Art

Conventional life preservers for aircraft are simply designed for securing the user to the seat or providing oxygen for breathing. These life preservers give little help when the aircraft exploded.

SUMMARY OF THE INVENTION

This invention provides a life preserver for aircraft that effectively protects the user, and helps the user fall from the aircraft safely in an emergency.

According to the preferred embodiment of the present invention, the life preserver comprises a fire-protective, anti-knock, inflatable bag defining an inflatable chamber and a life chamber within the inflatable chamber and having an exit, a bumper frame structure supported inside the life chamber for protecting the user in the life chamber, a safety helmet with a mouthpiece connected to an oxygen cylinder mounted in the bumper frame structure for providing oxygen to the user, and a parachute carried on the inflatable bag on the outside and controlled by a rip cord suspended inside the life chamber.

BRIEF DESCRIPTION OF THE DRAWINGS

The invention is further described hereafter, by way of example only, with reference to the accompanying drawings, in which.

DETAILED DESCRIPTION OF THE PREFERRED EMBODIMENT

Figure 1:
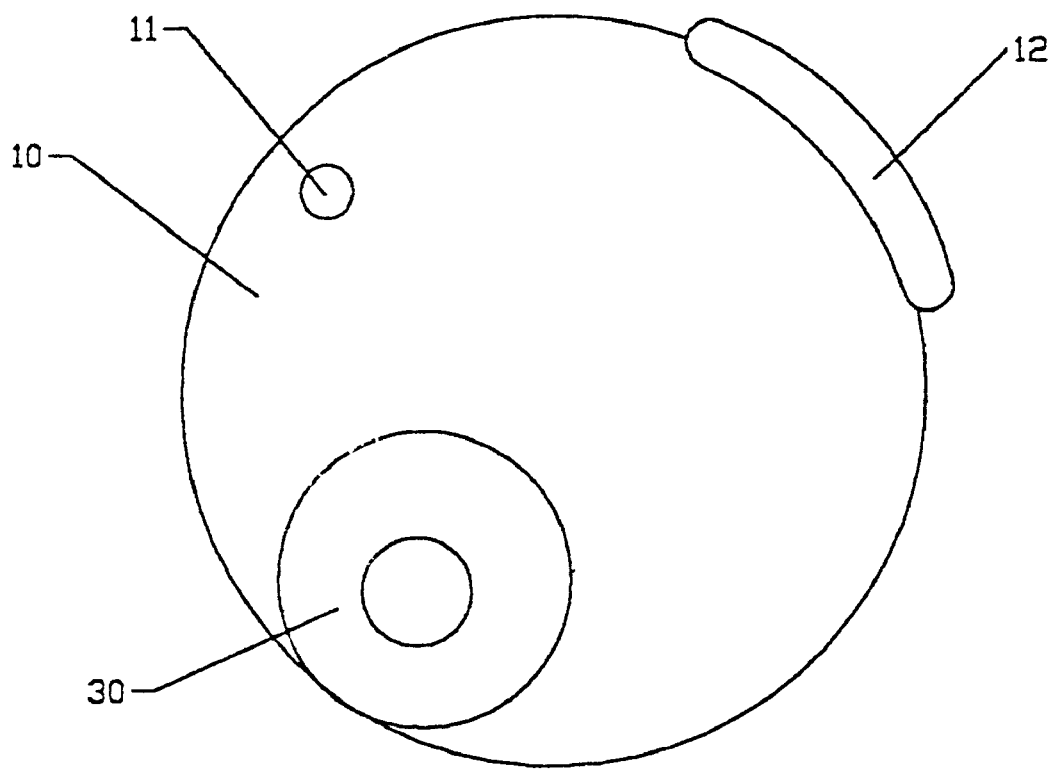
FIG. 1 shows the outer appearance of a life preserver for aircraft according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
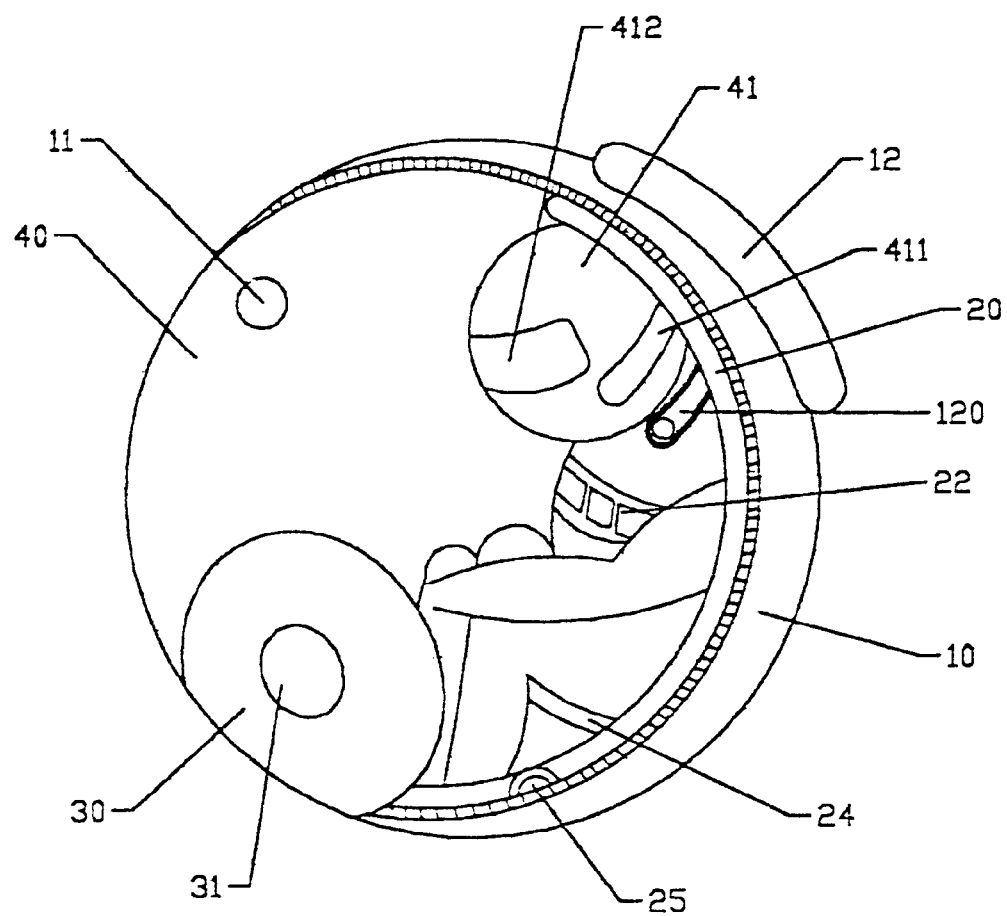
FIG. 2 is a sectional view of the present invention, showing the user protected inside the life chamber.

Referring to FIGS. 1 and 2, a life preserver in accordance with the present invention is generally comprised of a fire-protective, anti-knock, inflatable bag 10, and a bumper frame structure 20. The bumper frame structure 20 supports the fire-protective, anti-knock, inflatable bag 10 on the inside. The inflatable bag 10 defines a life chamber 40. The bumper frame structure 20 is mounted inside the life chamber 40 to support the inflatable bag 10. The inflatable bag 10 has an exit 30 through which the user can get into the life chamber 40 or get out of the life preserver.

Figure 3:
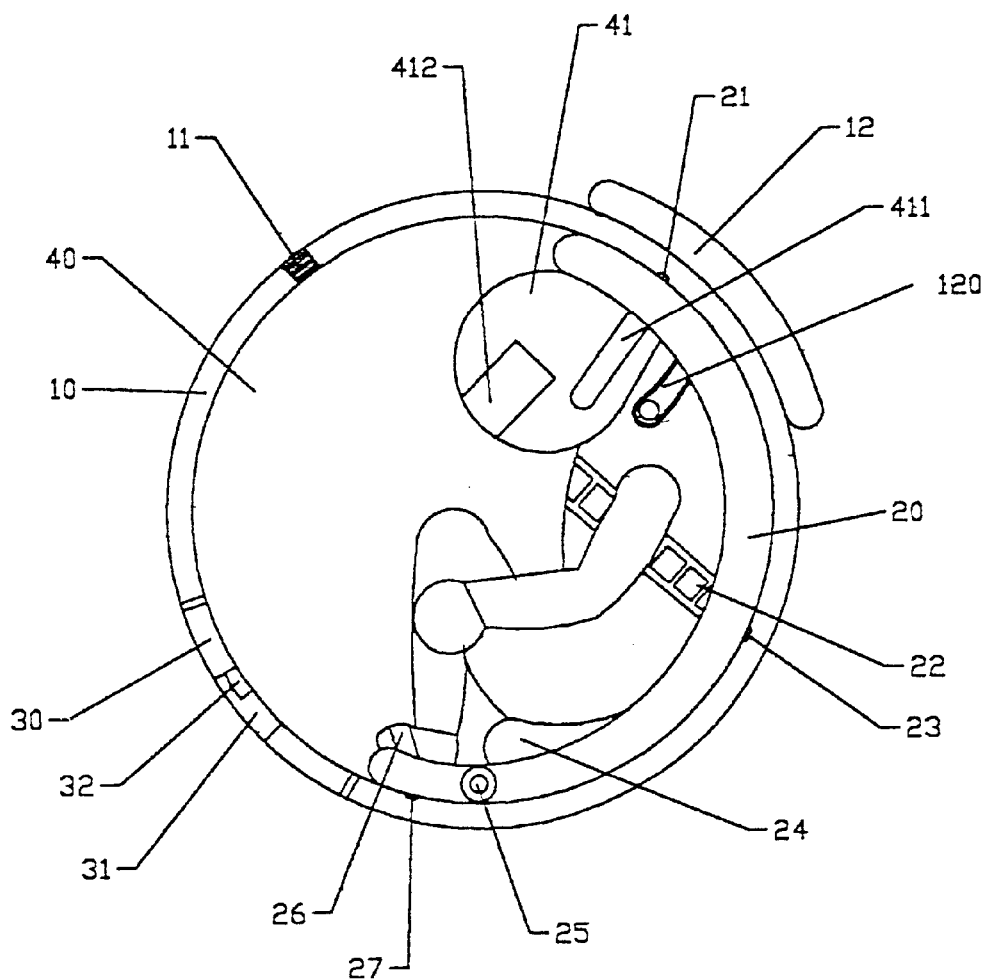
FIG. 3 is another sectional view of the life preserver when viewed from another angle.

Referring to FIG. 3 and FIG. 2 again, the inflatable bag 10 has an air valve 11 through which the inflatable bag 10 is inflated with compressed air, and is attached with a parachute 12. The parachute 12 is disposed at a location opposite to the exit 30. The bumper frame structure 20 has a spherical shape. A bolt 21 is fixed to the bumper frame structure 20 to hold a safety helmet 41 on the inside. The safety helmet 41 has a view glass 412 at the front side corresponding to the eyes, and a mouthpiece 411 at one side. A safety belt 22 is secured to the inside the bumper frame structure 20 below the safety helmet 41 by a fastening device 23 for securing the user in place. A cushion 24 is mounted on the bumper frame structure 20 at one end near the exit 30 on which the user sits. An oxygen cylinder 25 is mounted in a recessed hole (not shown) in the bumper frame structure 20 and connected to the mouthpiece 411 for providing oxygen to the user. Foot straps 26 are secured to the bumper frame structure 20 in front of the cushion 24 by a fastening device 27 for securing the user's feet in place. The exit 30 is a circular door mounted with a view window 31 and a lamp 32. Through the view window 31, the user can see the condition of the outside. The lamp 32 is preferably a mercury lamp for illumination. Further, a rip cord for parachute 120 is suspended inside the bumper frame structure 20. The user can open the parachute 12 by pulling the rip cord 120.

Referring to FIGS. 2 and 3 again, when in use, the inflatable bag 10 is inflated, then the exit 30 is closed when the user gets in the life chamber 40. When the exit 30 is closed, the lamp 32 is automatically turned on. When entering the life chamber 40, the user immediately sits on the cushion 24 and secured in place by the safety belt 22 and the foot straps 26, and the safety helmet 41 is put on the head. When the safety helmet 41 is put on the head, the mouthpiece 411 is fastened up. When falling from the aircraft in an emergency, the user can then pull the rip cord 120 to open the parachute 12, so as to slow down the falling speed of the life preserver.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A life preserver for aircraft, comprising:
   a fire-protective, anti-knock, inflatable bag defining an inflatable chamber and a life chamber within said inflatable chamber, said inflatable bag having a spherical shape when inflated, an exit through which the user can get in and out of said life chamber, and an air valve through which compressed air is filled into said inflatable chamber, said exit having a view window;
   illuminator means adapted for illuminating said life chamber;
   a smoothly curved bumper frame structure supported inside said lift chamber;

an oxygen cylinder mounted in said bumper frame structure to provide oxygen for breathing;

a safety helmet mounted on said bumper frame structure for putting on the user's head, said safety helmet having a view glass and a mouthpiece connected to said oxygen cylinder; a parachute carried on said inflatable bag on the outside and controlled to open by a rip cord being suspended inside said bumper frame structure;

a cushion mounted on said bumper frame structure on which the user sits; and strap means fastened to said bumper frame structure and adapted for securing the body and feet of the user.

* * * * *